(12) United States Patent
Vaswani et al.

(10) Patent No.: US 11,837,227 B2
(45) Date of Patent: Dec. 5, 2023

(54) SYSTEM FOR USER INITIATED GENERIC CONVERSATION WITH AN ARTIFICIALLY INTELLIGENT MACHINE

(71) Applicant: RN Chidakashi Technologies Pvt. Ltd., Mumbai (IN)

(72) Inventors: Sneh Vaswani, Mumbai (IN); Prashant Iyengar, Mumbai (IN); Chintan Raikar, Mumbai (IN)

(73) Assignee: RN CHIDAKASHI TECHNOLOGIES PVT LTD, Mumbai (IN)

( * ) Notice: Subject to any disclaimer, the term of this patent is extended or adjusted under 35 U.S.C. 154(b) by 0 days.

(21) Appl. No.: 17/264,840

(22) PCT Filed: Jan. 22, 2021

(86) PCT No.: PCT/IN2021/050067
§ 371 (c)(1),
(2) Date: Jan. 31, 2021

(87) PCT Pub. No.: WO2021/149079
PCT Pub. Date: Jul. 29, 2021

(65) Prior Publication Data
US 2023/0121824 A1    Apr. 20, 2023

(30) Foreign Application Priority Data
Jan. 23, 2020 (IN) .............................. 202021002986

(51) Int. Cl.
*G10L 15/22* (2006.01)
*G10L 15/32* (2013.01)

(52) U.S. Cl.
CPC .............. *G10L 15/22* (2013.01); *G10L 15/32* (2013.01); *G10L 2015/223* (2013.01)

(58) Field of Classification Search
CPC ... G10L 15/22; G10L 15/1822; G10L 15/183; G10L 15/26; G10L 15/18; G06F 40/295; G06F 40/35; G06F 40/30; G06F 16/3329; G06F 40/279
See application file for complete search history.

(56) References Cited

U.S. PATENT DOCUMENTS

| | | | | |
|---|---|---|---|---|
| 10,630,838 B2* | 4/2020 | McGann | ................ | G10L 15/22 |
| 11,164,562 B2* | 11/2021 | DiMascio | ............... | G10L 15/22 |
| 2011/0010641 A1* | 1/2011 | Wolff | ................... | G06Q 10/107 |
| | | | | 715/753 |
| 2013/0275164 A1* | 10/2013 | Gruber | ................... | G10L 17/22 |
| | | | | 705/5 |
| 2018/0329878 A1* | 11/2018 | Hirzel | ..................... | G06F 40/35 |

(Continued)

*Primary Examiner* — Mark Villena

(57) ABSTRACT

A system for user initiated generic conversation with an artificially intelligent machine is provided. The system includes a conversational server (CS) that executes a conversational architecture across multiple devices, a communication network and a remote device. The conversational architecture includes one or more conversational nodes connected by edges which encapsulates flow and logic and transport data between the one or more conversational nodes. The conversational server (CS) receives input, at an input node, from a user through an input modality and performs computation logic that generates output data to pass to an output node.

16 Claims, 15 Drawing Sheets

(56) References Cited

U.S. PATENT DOCUMENTS

| | | | |
|---|---|---|---|
| 2019/0182382 A1* | 6/2019 | Mazza | H04L 51/02 |
| 2019/0325868 A1* | 10/2019 | Lecue | G10L 25/63 |
| 2019/0377790 A1* | 12/2019 | Redmond | G06F 40/35 |
| 2020/0349919 A1* | 11/2020 | Wanas | G10L 15/1815 |
| 2021/0034820 A1* | 2/2021 | Perez Gonzalez | G10L 15/22 |

* cited by examiner

SYSTEM FOR USER INITIATED GENERIC CONVERSATION WITH AN ARTIFICIALLY INTELLIGENT MACHINE

CROSS-REFERENCE TO RELATED APPLICATIONS

This application claims priority to Indian patent application no. 202021002986 filed on Jan. 23, 2020, the complete disclosure of which, in its entirely, is herein incorporated by reference.

BACKGROUND

Technical Field

Embodiments of this disclosure generally relate to a conversational Artificial Intelligence (AI) system, and more particularly, to an architecture of the conversational AI system for plurality of user initiated conversation.

Description of the Related Art

Conversational Artificial Intelligence (AI) is a type of Artificial Intelligence (AI) that allows a user to interact with a plurality of applications, a plurality of websites, and a plurality of devices etc. via text, voice, audio, video etc. The conversational AI uses a plurality of technologies to process and contextualize user input in order to respond to the user. Nowadays, the conversational AI has been used for business in order to create personalized customer experiences. Companies continue to develop a variety of conversational AI to interact with customers. Though variety of conversational AI emerges day by day, more researches are still going on to develop a conversational AI that enables fastest user interaction which in turn improve user's conversational experience.

An architecture for conversational AI includes a plurality of nodes that illustrates execution steps of operations and edges that illustrates corresponding interconnections between the nodes. Conventional architecture for the conversational AI consumes more time in terms of computer resource processing and the response time for the user input is high. Thus, the conventional architecture for conversational AI may impede functioning of a computing device that is used for conversational purpose. Further, existing architecture for conversational AI are most complex in terms of design and scope of user-initiated conversations. There is no single architecture for conversational AI that is capable of supporting plurality of user-initiated conversation modalities. Existing conversational AI requires different conversational architecture for supporting different input modalities which in turn takes up more computational resources and increases the complexity of implementation. Hence, currently research is going on for a general conversational architecture that is capable of supporting plurality of user-initiated conversation.

Accordingly, there remains a need for an improved architecture for conversational AI system that is capable of supporting plurality of user-initiated conversation modalities.

SUMMARY

In view of the foregoing, an embodiment herein provides a system for user initiated conversation using an artificially intelligent machine. The system includes an artificially intelligent (AI) machine, a plurality of conversational nodes that are interconnected at edges to form a conversational network that encapsulates a conversational flow and logic to transport data associated with the conversational flow between the plurality of conversational nodes, and a conversational server that is communicatively connected to the artificially intelligent machine. The conversational server includes a first memory that stores a first set of instructions and a processor that is configured to execute the first set of instructions to initiate the plurality of conversational nodes to perform steps of (i) receiving an input query, at an input node, from a user to start the conversational flow using at least one input modality, (ii) transforming the input query at an input recognizing node (IR) associated with the artificially intelligent machine, into a first format that is suitable to processing the input, (iii) determining, at a query processing node (F), at least one parameter associated with the input by processing the first format of the input using an artificially intelligent model. The query processing node (F) transfers the conversational flow to a conversational node from the plurality of conversational nodes and the conversational node transfers the conversational flow to sub-query processing nodes to extract salient information associated with the input query to determine the at least one parameter. The at least one parameter comprises an input category or a primary entity. The processor is configured to execute the first set of instructions to initiate the plurality of conversational nodes to perform step of (i) executing a decision node (D) that maps the identified at least one parameter associated with the input to a function node, generating, by the function node, an output data to be fed to an output node (O), and (ii) executing, using the output node (O) associated with the artificially intelligent machine, commands or directives in the output data according to a sequence of an output data structure.

In an embodiment, the at least one parameter comprises at least one of an input sub-category, a secondary entity, an intent or a predefined information associated with the input query or an information associated with the user.

In another embodiment, the system transfers the data associated with the conversational flow to the decision node to check if the input query is a newly generated query or a follow up input query and associates the primary entity or the input category to the follow up query.

Optionally, the system includes a parallel node that executes a computational flow along all of the plurality of conversational nodes parallelly and waits for computation along all the conversational nodes before returning.

In an embodiment, the sub-query processing nodes include a first sub-query processing node and a second sub-query processing node. The input category and the input subcategory of the input query is identified at the first sub-query processing node 702A, or the primary entity and the secondary entity of the input query is detected at the second sub-query processing node.

In yet another embodiment, the plurality of conversational nodes include a sequential node, wherein the sequential node (S) is a structured activity node that executes a computational flow in a path along edges {1, 2, 3 . . . N} executing the computational flow in a sequence, wherein the sequential node provides Human Robot Interaction (HRI) where statements are spoken sequentially one after another by the user.

Optionally, the query processing node employs at least one parameter of an input part of speech (POS) tagging, a dependency parsing, a relationship extraction, or a constituent parsing.

Optionally, the output data is generated based on the input query that is recognized as at least one of a static information query or a dynamic information query.

Optionally, the output data is generated based on the input query that is recognized as a follow up query on the secondary entity, or a follow up query on the intent.

In an embodiment, the plurality of conversational nodes comprises a synchronous node, wherein the asynchronous node transfers the conversational flow of execution to a downstream node and waits for execution to be completed before transferring the conversational flow to an upstream node.

Optionally, plurality of conversational nodes comprises an asynchronous node, wherein the asynchronous node transfers the conversational flow of execution to a downstream node but does not wait for execution to be completed before transferring the conversational flow to an upstream node.

Optionally, the plurality of conversational nodes comprises a random node, wherein the random node selects one of the edges connected to the random node based on probability distribution of a conversational flow that is customized to the user.

Optionally, the commands are executed based on the output node that comprise of performing at least one action on the artificially intelligent machine or a remote device to capture data at the input.

In an embodiment, the commands are executed based on the output node that comprise of performing at least one action on the artificially intelligent machine or a remote device to capture data at the input.

In another embodiment, the conversational network comprises an access to the data associated with the conversational flow based on a partition key.

Optionally, the conversational network comprises a slot filling architecture.

In an embodiment, a method for user initiated conversation using an artificially intelligent machine is provided. The method includes (i) receiving an input query, at an input node, from a user to start a conversational flow using at least one input modality, wherein a plurality of conversational nodes are interconnected at edges to form a conversational network that encapsulates a conversational flow and logic to transport data associated with the conversational flow between the plurality of conversational nodes, (ii) transforming the input query at an input recognizing node (IR) associated with the artificially intelligent machine, into a first format that is suitable to processing the input, characterized in that, (iii) determining, at a query processing node (F), at least one parameter associated with the input by processing the first format of the input using an artificially intelligent model, wherein the query processing node (F) transfers the conversational flow to a conversational node from the plurality of conversational nodes and the conversational node transfers the conversational flow to sub-query processing nodes to extract salient information associated with the input query to determine the at least one parameter, wherein the at least one parameter comprises an input category or a primary entity, (iv) executing a decision node (D) that maps the identified at least one parameter associated with the input to a function node, (v) generating, by the function node, an output data to be fed to an output node (O), and (vi) executing, using the output node (O) associated with the artificially intelligent machine, commands or directives in the output data according to a sequence of an output data structure.

One or more non-transitory computer readable storage mediums storing one or more sequences of instructions, which when executed by one or more processors to perform a method for user initiated conversation using an artificially intelligent machine is provided. The method includes the steps of (i) receiving an input query, at an input node, from a user to start a conversational flow using at least one input modality, wherein a plurality of conversational nodes are interconnected at edges to form a conversational network that encapsulates a conversational flow and logic to transport data associated with the conversational flow between the plurality of conversational nodes, (ii) transforming the input query at an input recognizing node (IR) associated with the artificially intelligent machine, into a first format that is suitable to processing the input, characterized in that, (iii) determining, at a query processing node (F), at least one parameter associated with the input by processing the first format of the input using an artificially intelligent model, wherein the query processing node (F) transfers the conversational flow to a conversational node from the plurality of conversational nodes and the conversational node transfers the conversational flow to sub-query processing nodes to extract salient information associated with the input query to determine the at least one parameter, wherein the at least one parameter comprises an input category or a primary entity, (iv) executing a decision node (D) that maps the identified at least one parameter associated with the input to a function node, (v) generating, by the function node, an output data to be fed to an output node (O), and (vi) executing, using the output node (O) associated with the artificially intelligent machine, commands or directives in the output data according to a sequence of an output data structure.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
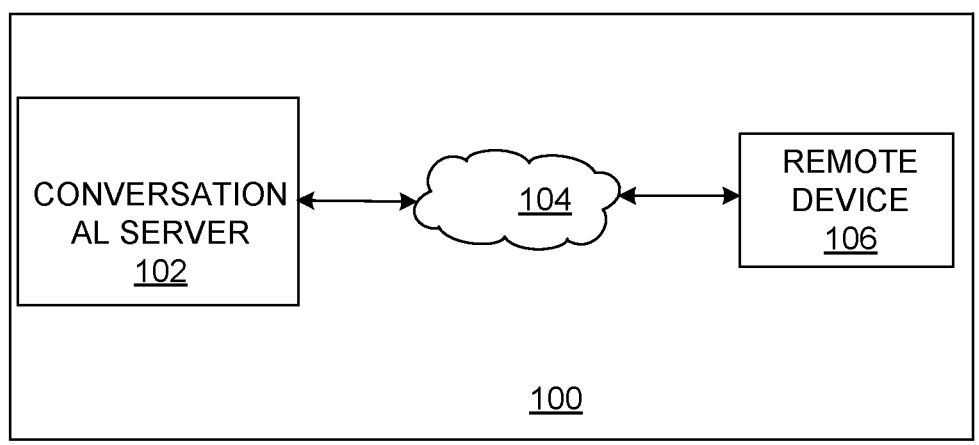
FIG. 1 illustrates a schematic diagram of a conversational system for execution of conversational flow architecture in accordance with the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an improved conversational architecture for a conversational AI system that is capable of supporting plurality of user-initiated conversation modalities. The embodiments herein achieve this by proposing a system for user-initiated conversation with an artificially intelligent machine. Referring now to the drawings, and more particularly to FIGS. 1 through 13, where similar reference characters denote corresponding features consistently throughout the figures, there are shown preferred embodiments.

FIG. 1 illustrates a schematic diagram of a conversational system 100 for execution of a conversational flow architecture in accordance with the embodiments herein. In particular, the conversational flow architecture is a conversational network. The conversational system 100 includes a conversational server (CS) 102, a communication network 104 and a remote device 106 (e.g. a sink device). The remote device 106 may be an artificially intelligent machine. The conversational network includes one or more conversational nodes connected by edges which encapsulates the conversational flow and logic and transport data between the one or more conversational nodes. In one embodiment, the one or more conversational nodes run across one or more devices (e.g. the conversational server (CS) 102, the remote device 106 or any third party device). The conversational server (CS) 102 includes a first memory that stores a first set of instructions and a first processor that executes the first set of instructions. Conversation nodes are defined as a unit of conversation. Each conversation node is associated with salient information that includes one or more of the parameters like a primary entity or an input category. The one or more parameters may also include a secondary entity, a category, a sub-category, an intent or a predefined information associated with the input query or an information associated with the user. For example, if the conversation is about India, then the primary entity is India, the category is places, the sub-category is country. Each conversation flow may be customized to a user, not limited to using the information associated with the user like age preference, location preference, gender preference, date preference, time preference etc.

In one embodiment, the first processor includes a downstream processor and an upstream processor. In one embodiment, the conversational server (CS) 102 is a cloud device. In one embodiment, the conversational server (CS) 102 is a local device. In one embodiment, the conversational server (CS) 102 is but not limited to a smartphone, personal digital assistant (PDA), tablet computer, notebook computer, or any other suitable computing device. The remote device 106 includes a second memory that stores a second set of instructions and a second processor that executes the second set of instructions. In one embodiment, the second processor includes a downstream processor and an upstream processor. In one embodiment, the remote device 106 is a robot. In one embodiment, the remote device 106 is connected to one or more sensors and one or more computing units. In one embodiment, the remote device 106 is an artificially intelligent machine. In one embodiment, the communication network 104 is a wireless network. In one embodiment, the communication network 104 is a wired network.

The one or more conversational nodes includes but not limited to an input node (I), an output node (O), a sequential node (S), a parallel node (P), a synchronous node, an asynchronous node (A), a decision node (D), a random node (R), an input listening node (IL), an input recognizing node (IR), and a query processing node or a functional processing node (F). The basic element of conversation is the conversation node which is the smallest unit of conversation and many conversation nodes may be networked together to form a larger conversation. The smallest unit of conversation may contain only an input or output node. The conversation nodes may be user initiated conversations. Various combinations of conversation nodes may be grouped together to create a continuous interactive conversation flow between the user and the remote device 106. The transition from one micro conversation to another may be governed by the decision node.

The input node (I) is a type of source node that receives input data and performs computational logic that generates data which can be used to pass to the output node which uses input data and stored output node template to generate desired output data which is passed to the sink node on a sink device (e.g. the remote device 106). The output node (O) is a type of sink node that sends directives back to the sink device. The directives are executed on the sink device. The sequential node (S) is a structured activity node that executes the computational flow in a path along edges {1, 2, 3 . . . N}. The sequential node executes the computational flow in a sequence. In one embodiment, the sequential node moves to (i+1) only after computational flow of execution along (i) is completed. In one embodiment, the sequential node provides Human Robot Interaction (HRI) where statements are spoken sequentially one after another. The Parallel node (P) executes the computational flow along all the nodes and waits for computation along all the nodes before returning. In an exemplary embodiment, the parallel node provides experience of reading the news, showing images on the screen and moving to provide immersive Human Robot Interaction. The synchronous node passes the computational flow of execution to a downstream node and waits for a result provided by the downstream node before passing the message to an upstream node that called it. In an exemplary embodiment, the computational flow enters the upstream node and then enters the downstream node. It performs the computation defined in the downstream node and then returns result upstream to the upstream node. In an embodiment, all nodes are synchronous node by default. The asynchronous node passes the computational flow of execution to the downstream node but does not wait for execution to be completed before passing message to the upstream node. The decision node (D) selects one of the output edges which are connected to the output nodes based on the input, and parameters associated with the input. The query processing node (F) performs operations on input to extract relevant information that aids in formulating responses to those queries. In one embodiment, the query processing includes at least one of but not limited to (i) input classification and sub classification (ii) input primary and secondary entity detection (iii) input sentiment analysis (iv) input type analysis or (v) input part of speech (POS) tagging, dependency parsing, relationship extraction, or constituent parsing. In one embodiment, the query processing node or the functional processing node (F) employs one or more Artificial Intelligence (AI) algorithms to extract information from the input to generate relevant output for the input. The random node (R) selects one of the edges connected to the random node (R) based on probability distribution that is stored per user. In one embodiment, the random node (R) selects each of the edges with same relative frequency if the probability distribution is uniform. The input listening node (IL), and the input recognizing node (IR) performs input listening detection and input recognition based on input listening.

The conversational server (CS) 102 executes the input node (I) that receives an input or an input query or a query from the user. In one embodiment, the user provides the input to the conversational server (CS) 102 through input modalities. In one embodiment, the input modalities include but not limited to a microphone, a keypad, a camera, a sensor, or a user interface. In one embodiment, the input modalities are embedded in the remote device 106. In one embodiment, the input query is a multimodal input query. In one embodiment, the input may include but not limited to a speech, a text, an audio, a visual data, a gesture etc. In one embodiment, the conversational server (CS) 102 transfers the input to the remote device 106 over the communication network 104 for input listening and input recognition. The remote device 106 listens and recognizes the input using the input listening node (IL), and the input recognizing node (IR) and transfers the recognized input to the conversational server (CS) 102. The conversational server (CS) 102 executes the query processing node or the functional processing node (F) that processes the recognized input to identify parameters associated with the input. The conversational server (CS) 102 executes the decision node (D) that maps the identified parameters associated with the input to functions that may generate an output data to be fed to the output node (O). The output node (O) receives the output data from the functions that generates the output data relevant to the received input. In one embodiment, the output node (O) includes a sequence of output data structure. In one embodiment, the output node (O) executes on a sink device. The sink device executes the directives or commands provided in the output data according to the sequence of output data structure. The directives or commands are executed based on the output node that comprise of performing at least one action on an artificially intelligent machine or a remote device to capture data at the input node. In one embodiment, the directives or commands includes but not limited to outputs of format such as audio, video, or motion directives etc. given to one or more remote devices 106 remotely. In one embodiment, the directives or commands that are required to be executed on the sink device includes but not limited to volume control, shut down, sleep, sensor input, directive to initiate capture of a speech, a text, an audio, or visual data to be provided to the input node (I) for processing. In one embodiment, the sink device and the remote device 106 are same.

In one exemplary embodiment, the conversation AI is embedded in a robot (e.g. the remote device 106) wherein a conversation initiated between the user and the robot. The robot includes a display unit, a speaker, a microphone, a keypad, one or more sensors and a processing unit. The robot receives an input query from the user. The robot transfers the input query to the conversational server (CS) 102 for processing the input query. The conversational server (CS) 102 processes the input query and sends an output directive to the robot (e.g. the remote device 106) to execute an output corresponding to the input query.

There may be a plurality of conversational networks connected with each other with conversational nodes. In another embodiment, a set of conversational nodes are encapsulated together to form a new conversational network. The new conversational network may provide ability to reuse the set of conversational nodes at different parts of the conversational network. The new conversational network may provide ability to reuse the set of conversational nodes to share with the plurality of conversational networks.

Figure 2:
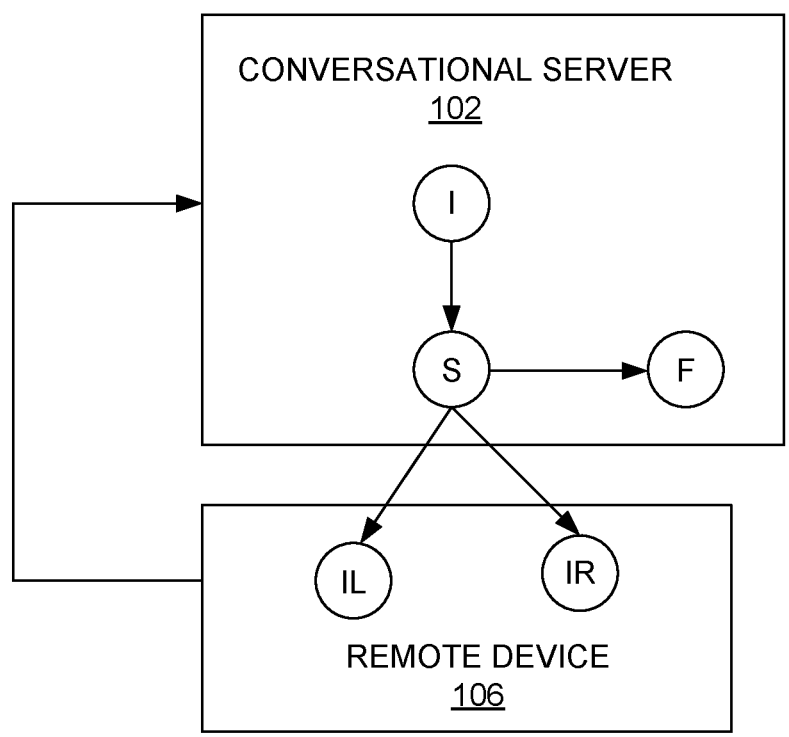
FIG. 2 illustrates an exemplary graphical representation of an input node (I) that receives and processes the input in accordance with the embodiments herein.

FIG. 2 illustrates an exemplary graphical representation of an input node (I) that receives and processes the input in accordance with the embodiments herein. The input node (I) is a type of source node that receives input from a user. In one embodiment, the input node (I) may executed on the conversational server 102 that initiates flow of a conversation. In one embodiment, the user provides the input to the conversational server (CS) 102 through input modalities. In one embodiment, the input modalities are embedded in the remote device 106. In one embodiment, the input may include but not limited to a speech, a text, an audio, visual data, motion data etc. The input node (I) receives the input from the user and executes computational logic that selects one of the output nodes (O) for execution. In one embodiment, the input node (I) receives the input and performs computational logic that generates data which can be used to pass to the selected output node (O) that uses data generated by the input node (I) and stored output node template to generate desired output data which is passed to the sink node on the sink device.

In one embodiment, the input node (I) receives an audio input or a video input from the user. The input node (I) transfers the audio input or the video input to the remote device 106 that includes the input listening node (IL), and the input recognizing node (IR). The remote device 106 incorporated with the one or more sensors and one or more computing units. The input listening node (IL) performs human speech listening detection in the audio input or the video input and transfers resultant stream to the input recognizing node (IR). The input recognizing node (IR) converts the human speech into text and transfers resultant text to the conversational server 102 for query processing.

In one embodiment, the input node (I) receives the video input from the user. The input node (I) transfers the video input to the remote device 106 that includes the input listening node (IL), and the input recognizing node (IR). The remote device 106 is incorporated with the one or more sensors and one or more computing units. The input listening node (IL) performs facial detection in the audio input or the video input and transfers resultant stream to the input recognizing node (IR). The input recognizing node (IR) performs a facial recognition and transfers resultant stream to the conversational server 102 for query processing.

In one embodiment, the remote device 106 performs offline input recognition using an offline input recognizing node. In one embodiment, the remote device 106 performs online input recognition using an online input recognizing node. In one embodiment, the remote device 106 performs offline input recognition and then performs the online input recognition on the resultant stream of offline input recognition.

Figure 3A:
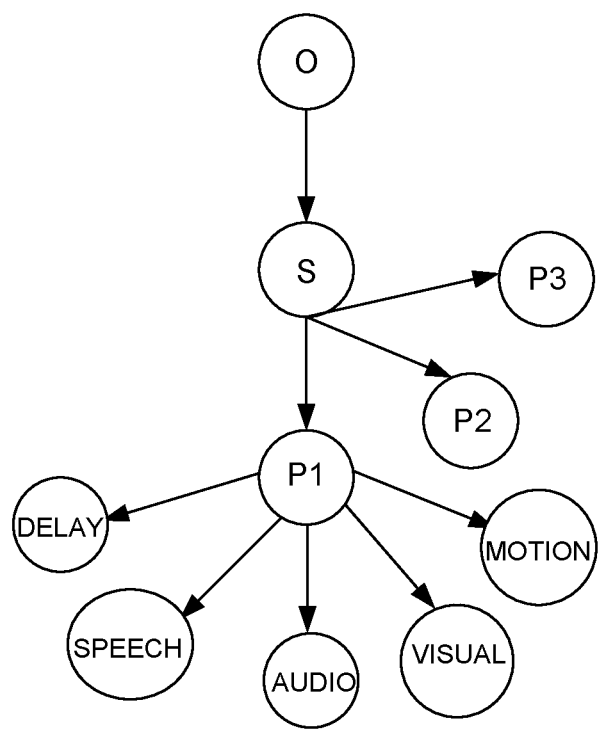
FIG. 3A illustrates an exemplary graphical representation of an output node (O) in accordance with the embodiments herein.

FIG. 3A illustrates an exemplary graphical representation of an output node (O) in accordance with the embodiments herein. The output node (O) is executed on an output device. In an embodiment, the output device is typically a secondary device. The output device receives the computed control for processing. In an exemplary embodiment, the output node (O) includes but not limited to a delay, an audio, a speech, a visual, or a motion execution block. In one embodiment, any human robot interaction is realized as a sequence of parallel blocks. In each of parallel blocks commands relating to each of blocks are executed in parallel. The output node (O) accepts data in multiple formats. The output node (O) may consist of a sequence of such output structures. The sink device may execute these output data packets by executing the commands provided in each of the channel's directives.

Figure 3B:
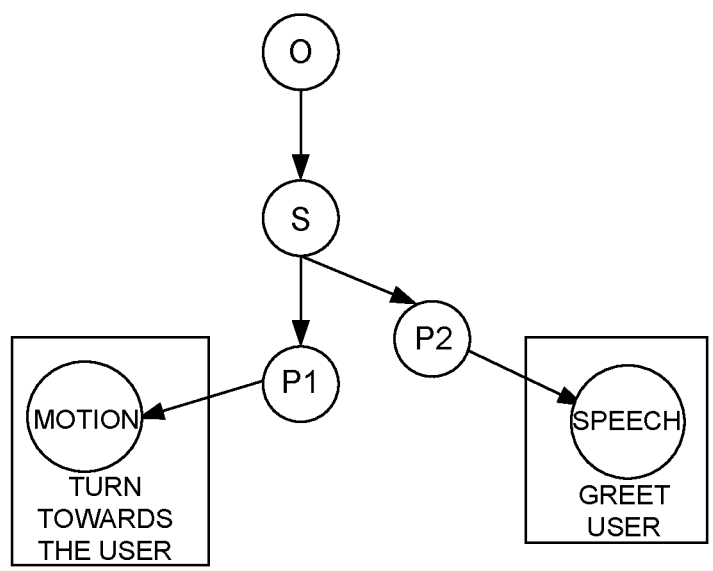
FIG. 3B illustrates an exemplary graphical representation of an output node (O) executed on a robot in accordance with the embodiments herein.

FIG. 3B illustrates an exemplary graphical representation of an output node (O) executed on a robot in accordance with the embodiments herein. For a robot that needs to turn towards the user and greet the user, the output processing is illustrated in the FIG. 3B.

Figure 4A:
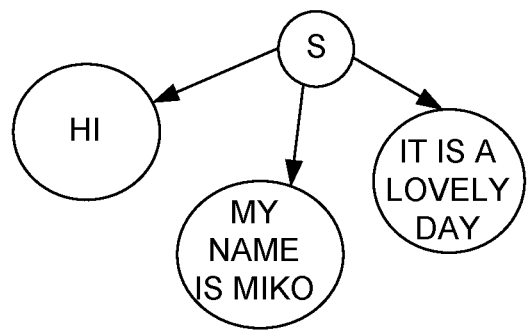
FIG. 4A illustrates an exemplary graphical representation of a sequential node (S) in accordance with the embodiments herein.

FIG. 4A illustrates an exemplary graphical representation of a sequential node (S) in accordance with the embodiments herein. The sequential node (S) provides Human Robot Interaction where statements are spoken sequentially one after another.

Figure 4B:
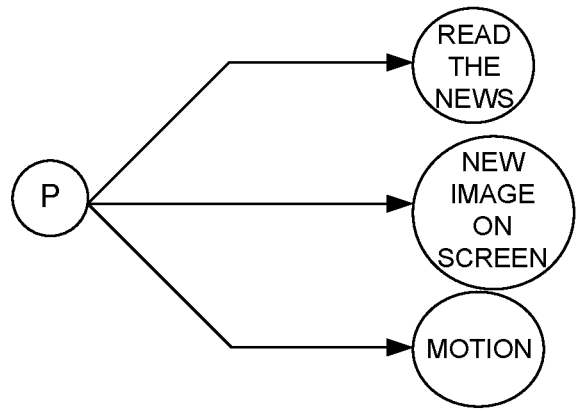
FIG. 4B illustrates an exemplary graphical representation of a parallel node (P) in accordance with the embodiments herein.

FIG. 4B illustrates an exemplary graphical representation of a parallel node (P) in accordance with the embodiments herein. The parallel node (P) provides the experience of reading news, showing new images on a screen and moving to provide immersive Human Robot Interaction.

Figure 5B:
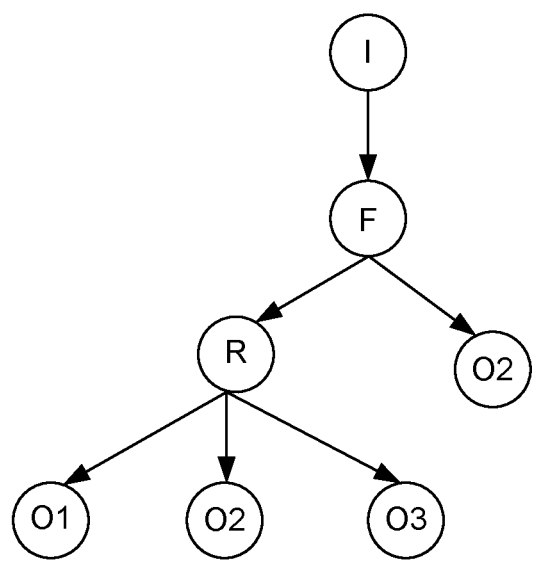
FIG. 5B illustrates an exemplary graphical representation of a random node (R) in accordance with the embodiments herein.
Figure 5A:
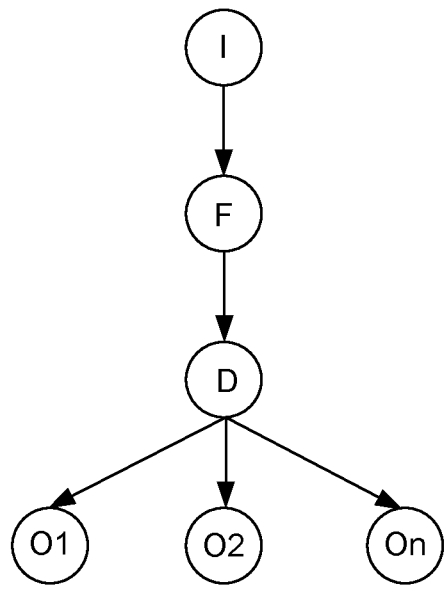
FIG. 5A illustrates an exemplary graphical representation of a decision node (D) in accordance with the embodiments herein.

FIG. 5A illustrates an exemplary graphical representation of a decision node (D) in accordance with the embodiments herein. The decision node (D) selects one of the output edges that are connected with the output nodes based on the input, input category and salient information associated with the input. The decision node may redirect the conversational flow based on one or more of the following parameters, (a) based on the input query and the parameters extracted from input query, (b) based on the primary entity or the secondary entity or sentiments or the intent, (c) based on a location of the user, for example, to Introduce cultural preferences and, (d) based on environmental factors like seasons etc.

FIG. 5B illustrates an exemplary graphical representation of a random node (R) in accordance with the embodiments herein. The random node (R) selects one of the edges connected to the random node (R) based on probability distribution that is stored per user. In one embodiment, the random node (R) selects each of the edges with same relative frequency if probability distribution is uniform.

Figure 6:
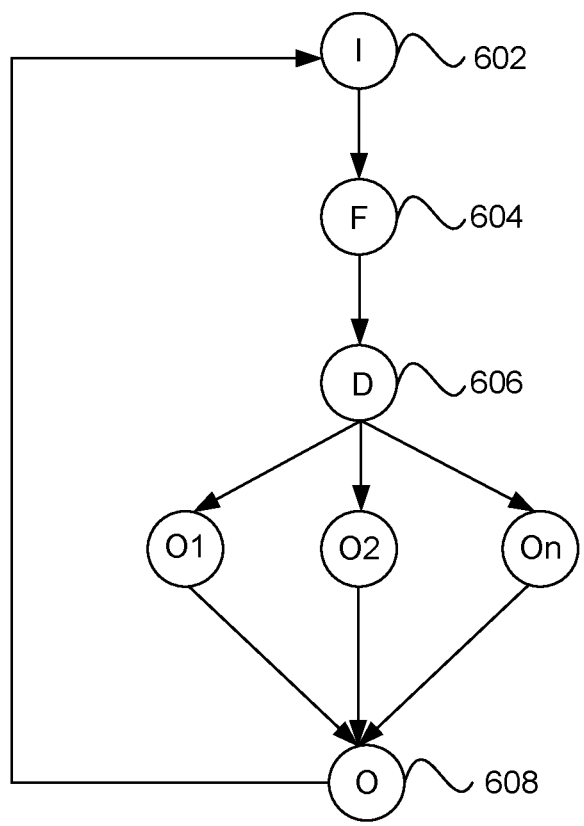
FIG. 6 illustrates an exemplary graphical representation of conversational event loop which encapsulates processing logic of general-purpose user-initiated conversation in accordance with the embodiments herein.

FIG. 6 illustrates an exemplary graphical representation of conversational event loop which encapsulates processing logic of general-purpose user-initiated conversation in accordance with the embodiments herein. At step 602, an input is processed at an input node (I) to recognize the input upon receiving the input at the input node (I). At step 604, the recognized input is processed at a query processing node (F) to identify parameters associated with the input. At step 606, a decision node selects one of the output edges that are connected with the output nodes based on the input, input category and salient information associated with the input. At step 608, an output corresponding to the input is provided.

Figure 7A:
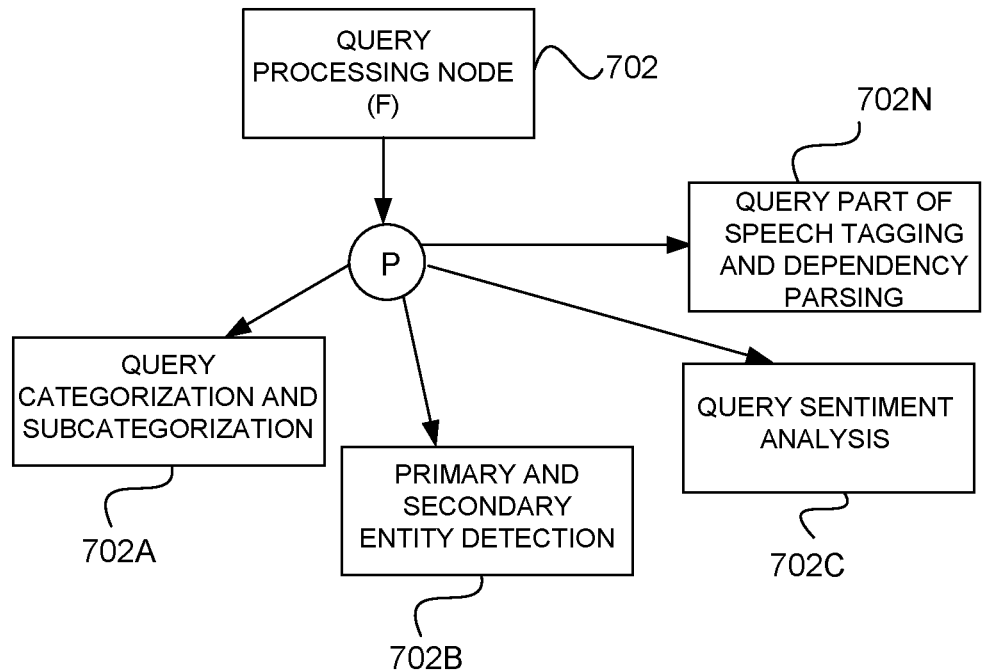
FIG. 7A illustrates an exemplary graphical representation of query processing in accordance with the embodiments herein.

FIG. 7A illustrates an exemplary graphical representation of query processing in accordance with the embodiments herein. The query processing node (F) 702 transfers the control flow to a parallel node (P) and the parallel node (P) transfers control flow parallelly to sub query processing nodes 702A-N to extract salient information from the input. At a first sub-query processing node 702A, input category and subcategory are identified. At a second sub-query processing node 702B, input primary and secondary entity are detected. At a third sub-query processing node 702C, input sentiment is analyzed. At a fourth sub-query processing node 702N, input part of speech tagging, and dependency parsing are performed.

Figure 7B:
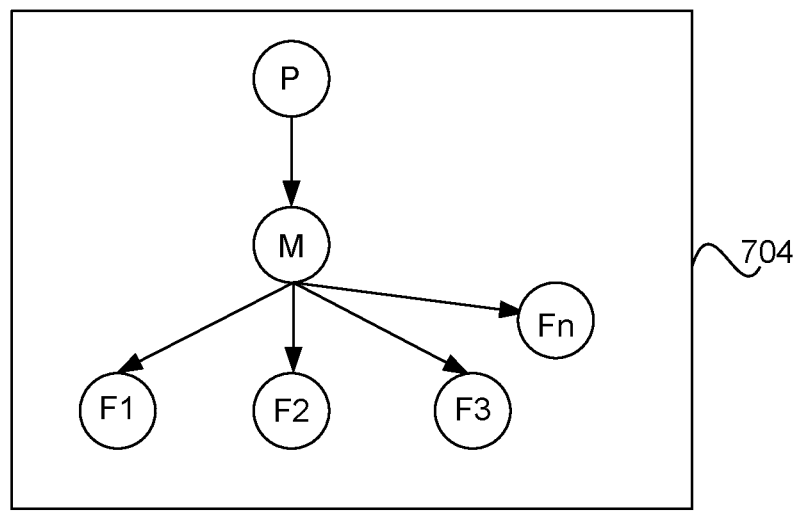
FIG. 7B illustrates an exemplary graphical representation of decision block in accordance with the embodiments herein.

FIG. 7B illustrates an exemplary graphical representation of decision block 704 in accordance with the embodiments herein. The decision block 704 maps input parameters to function nodes that generates output to be fed to the output node.

In one exemplary embodiment, a user initiates conversation between the user and a robot. The user provides an input query via an input interface associated with the robot. In one embodiment, the input query is a static information query or a dynamic information query. The robot transfers the input query to the conversational server (CS) 102. The conversational server (CS) 102 executes the query processing node (F) to process the input query to identify query category, subcategory, primary entity and secondary entity etc. The conversational server (CS) 102 executes the decision node (D) to select the suitable function node that would generate output data to be fed to the output node. The function node maps and fed the computed output data to the output node in the sink device or the robot. The output node executed on the sink device executes the output data based on the stored output template node.

In one embodiment, the input query includes at least one of but not limited to a static information query, a dynamic information query, a follow up query on a primary entity, a follow up query on a secondary entity, or a follow up query on intent.

Figure 8:
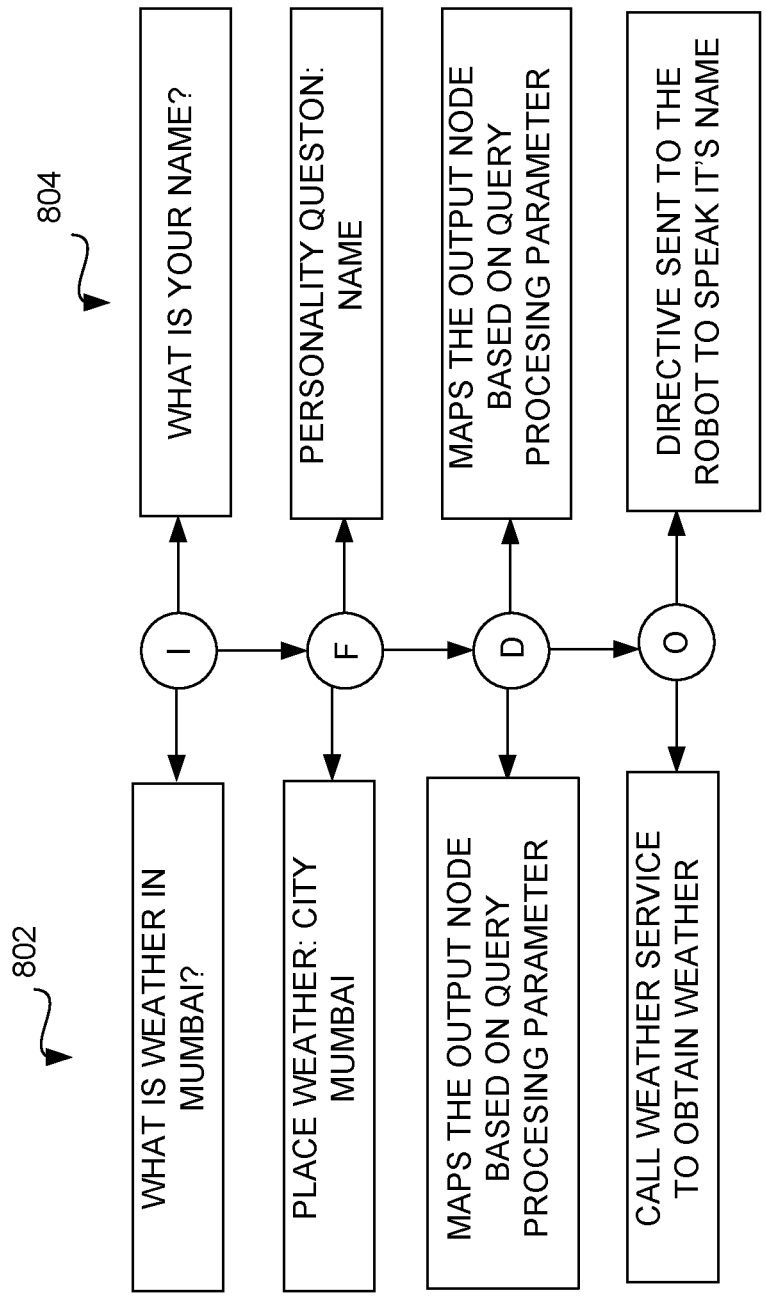
FIG. 8 illustrates an exemplary graphical representation of conversational event loop for interacting with a robot in accordance with the embodiments herein.

FIG. 8 illustrates an exemplary graphical representation of conversational event loop for interacting with a robot in accordance with the embodiments herein. At a process 802, a dynamic information query is received and processed to obtain a response using the conversational loop in accordance with the embodiments herein. In an exemplary embodiment, at the process of 802, a dynamic information query: what is weather in Mumbai? is obtained at the input node (I). The dynamic information query is provided to a query processing node (F). The query processing node (F) processes the query to identify parameters associated with the query such as Place weather and city Mumbai. The parameters associated with the query is provided to a decision node (D) and the decision node (D) calls weather service to obtain weather information and outputs the weather information to the output node (O). At a process 804, a static information query is received and processed to obtain a response using the conversational loop in in accordance with the embodiments herein. In an exemplary embodiment, at the process of 804, a static information query: what is your name? is obtained at the input node (I). The static information query is provided to the query processing node (F). The query processing node (F) processes the query to identify parameters associated with the query such as Personality question: Name. The parameters associated with the query is provided to the decision node (D) and the decision node (D) sends directives to the output node (O) on the robot to speak its name.

Figure 9:
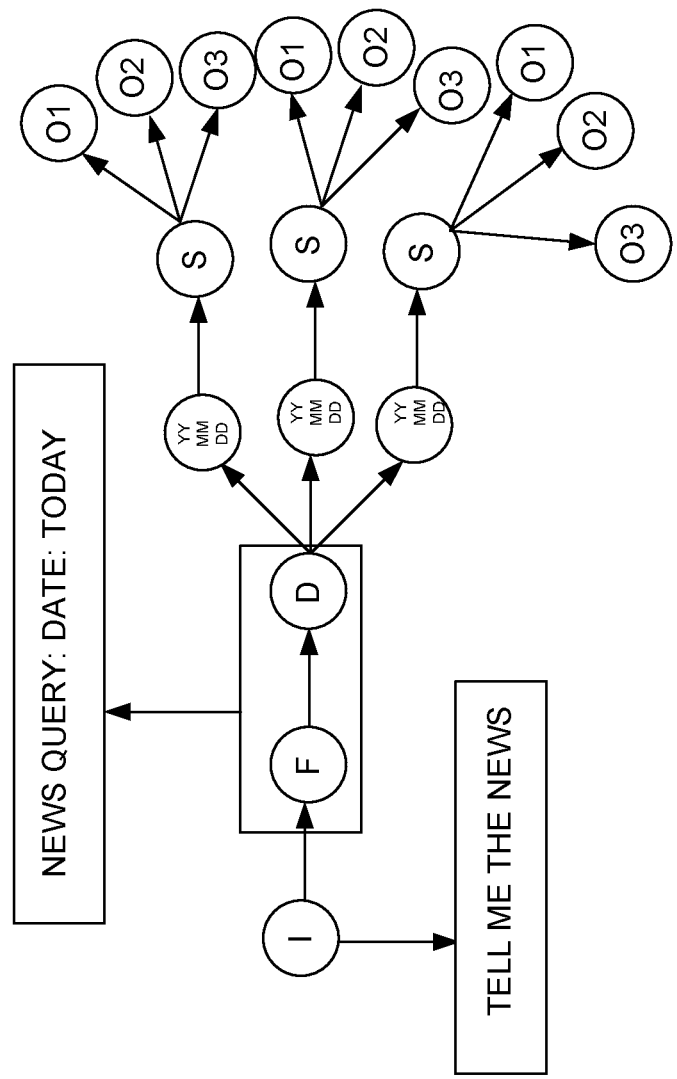
FIG. 9 illustrates an exemplary graphical representation of conversational event loop for obtaining news in accordance with the embodiments herein.

FIG. 9 illustrates an exemplary graphical representation of conversational event loop for obtaining news in accordance with the embodiments herein. In this exemplary embodiment, the decision node selects the date for which news is queried, various items are relayed sequentially based on the input query parameters. In this modality on query processing step, the conversational system 100 is required to access the data based on partition key.

Figure 10A:
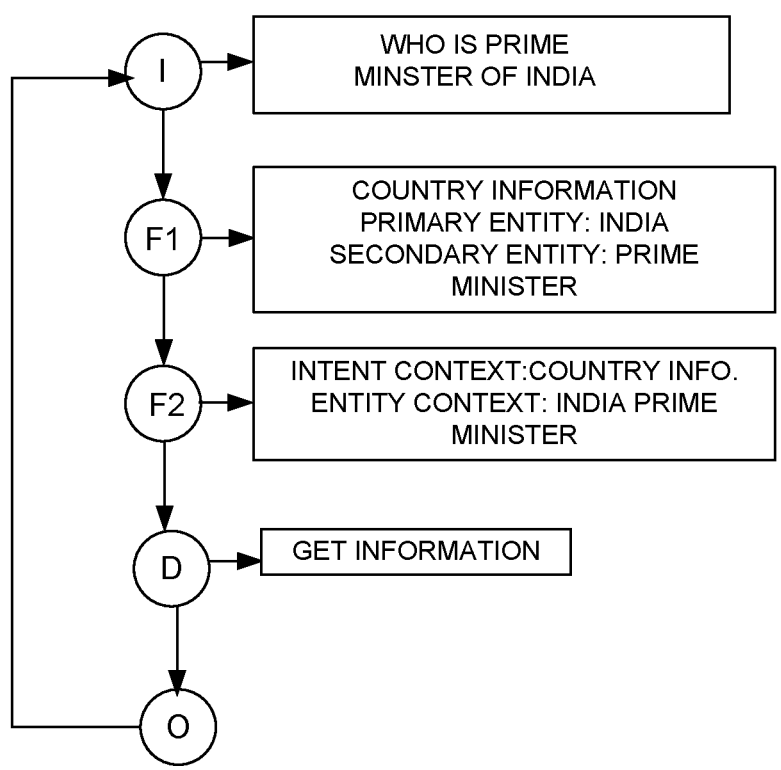
FIGS. 10A and 10B illustrates an exemplary graphical representation of conversational event loop for enquire follow up query based on previous in accordance with the embodiments herein.
Figure 10B:
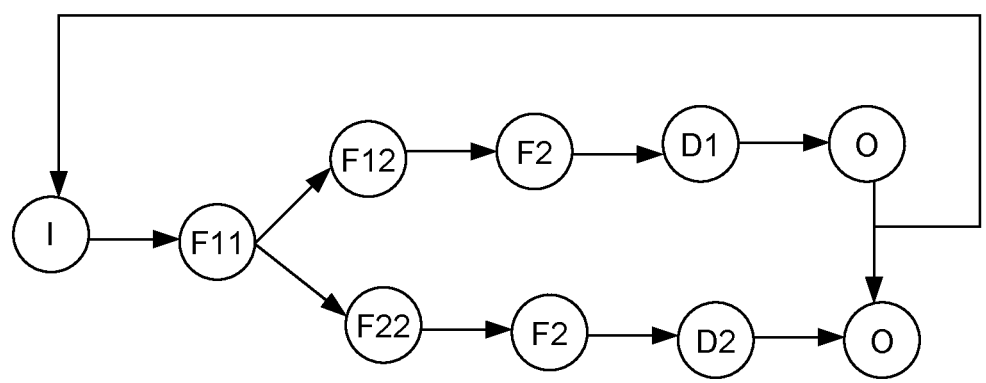

FIGS. 10A and 10B illustrates an exemplary graphical representation of conversational event loop for enquire follow up query based on previous in accordance with the embodiments herein. In FIG. 10A, at the input node (I), a query is accepted. At the functional processing node F1, a query category, subcategory, primary and secondary entity are identified. At the functional processing node F2, an intent category and a subcategory are stored as intent context and the primary entity is stored as entity context. At the decision node (D), functions that generate output data is identified. At the output node (O), the output data is executed. In FIG. 10B, at the input node (I), a query is accepted. At the functional processing node F11, the accepted query is checked whether it is a new query, or a follow up query based on stored intent category or primary entity. The functional processing node F11 directs the query to the functional processing node F12 if the accepted query is a new query. The functional processing node F22 directs the query to the functional processing node F12 if the accepted query is a follow up query. At the functional processing node F12, a query category is identified. At the functional processing node F22, a query category is identified as a known primary and/or a secondary entity. At the functional processing node F2, an intent content is stored. At the decision node D1, and D2, an output node (O) is selected. At the output node (O), an output is executed. In an embodiment, the follow up query includes at least one of a primary entity follow up query, a secondary entity a follow up query, an intent based follow up query, or an entity based follow up query. In an exemplary embodiment, "Who is prime minister of India?" is a new query. In the new query, the primary entity is India, the secondary entity is prime minister, the intent context is country and the entity context is India prime minister. In one exemplary embodiment, "Who is its president?" is a primary entity follow-up query. In this primary entity follow-up query, the primary entity is India, the secondary entity is president, the intent context is India and the entity context is India president. In one exemplary embodiment, "Who is prime minister of India and of Nepal?" is a secondary entity follow-up query. In this secondary entity follow-up query, the primary entity is Nepal, the secondary entity is prime minister, the intent context is Nepal and the entity context is prime minister. In one exemplary embodiment, "What is weather here?" is a follow-up query on the intent. In this follow-up query, the intent is weather, the primary entity is India, the intent context is weather, and the entity context is India.

Figure 11:
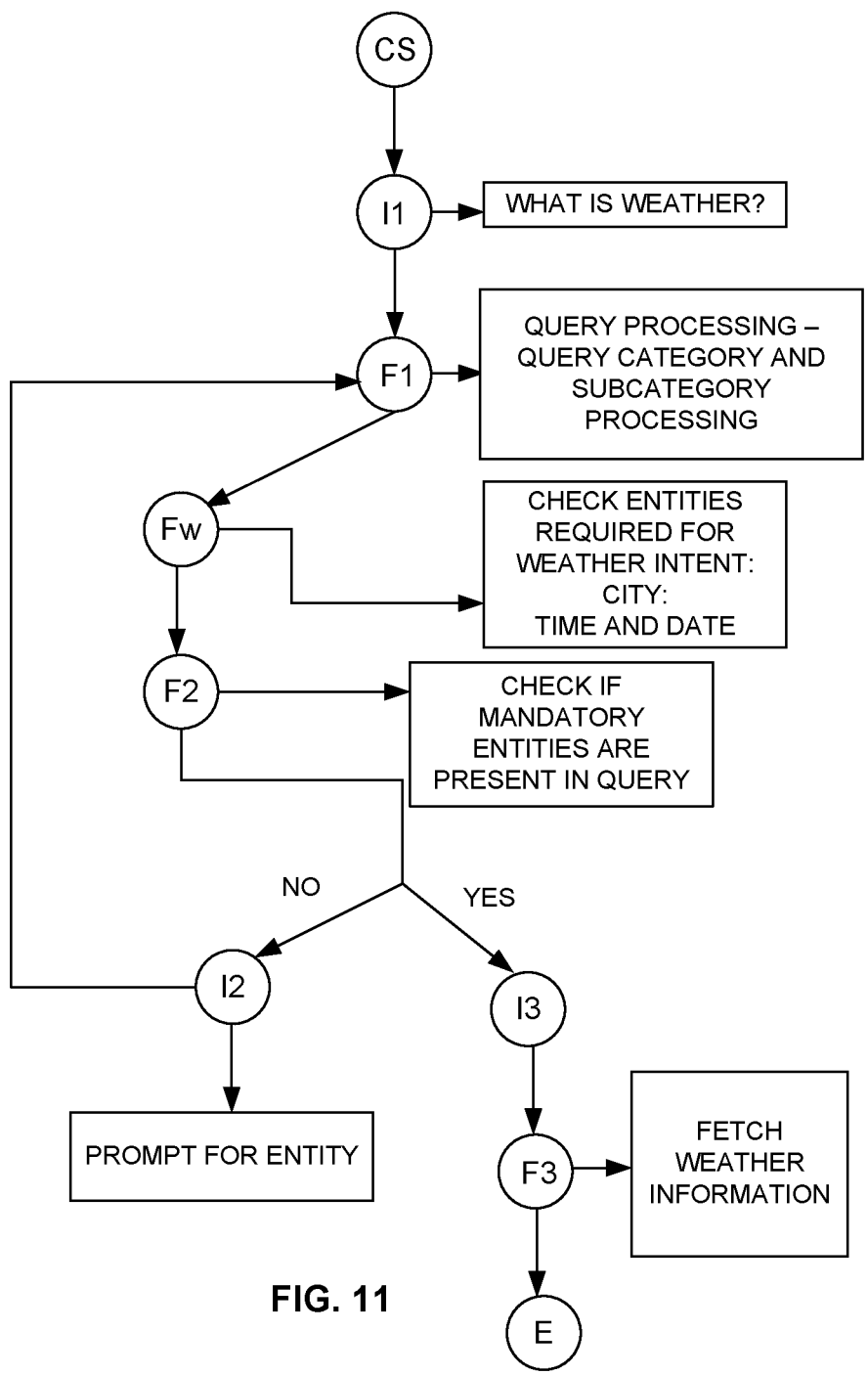
FIG. 11 illustrates an exemplary slot filling architecture using event loop processing in accordance with the embodiments herein.

FIG. 11 illustrates an exemplary slot filling architecture using event loop processing in accordance with the embodiments herein. The slot filling is a form of user-initiated conversation, the conversational system 100 is engaged in follow up question to provide result to a user-initiated query. In an exemplary embodiment, in a computational flow, at the input node (I1), a query "What is weather?" is obtained. At the query processing node (F1), the query is processed to identify the query category and the subcategory. At the query processing node (Fw), whether entities required for weather intent is checked such as city, time and date. At the query processing node (F2), it is checking whether mandatory entities are present in the query. If yes, the computational flow enters the input node (I2), and into function node (F3) to fetch the weather information and an end node (E) ends the computational flow. If No, the computational flow enters the input node (I3), and enters the query processing node (F1) to identify entity in the query.

Figure 12:
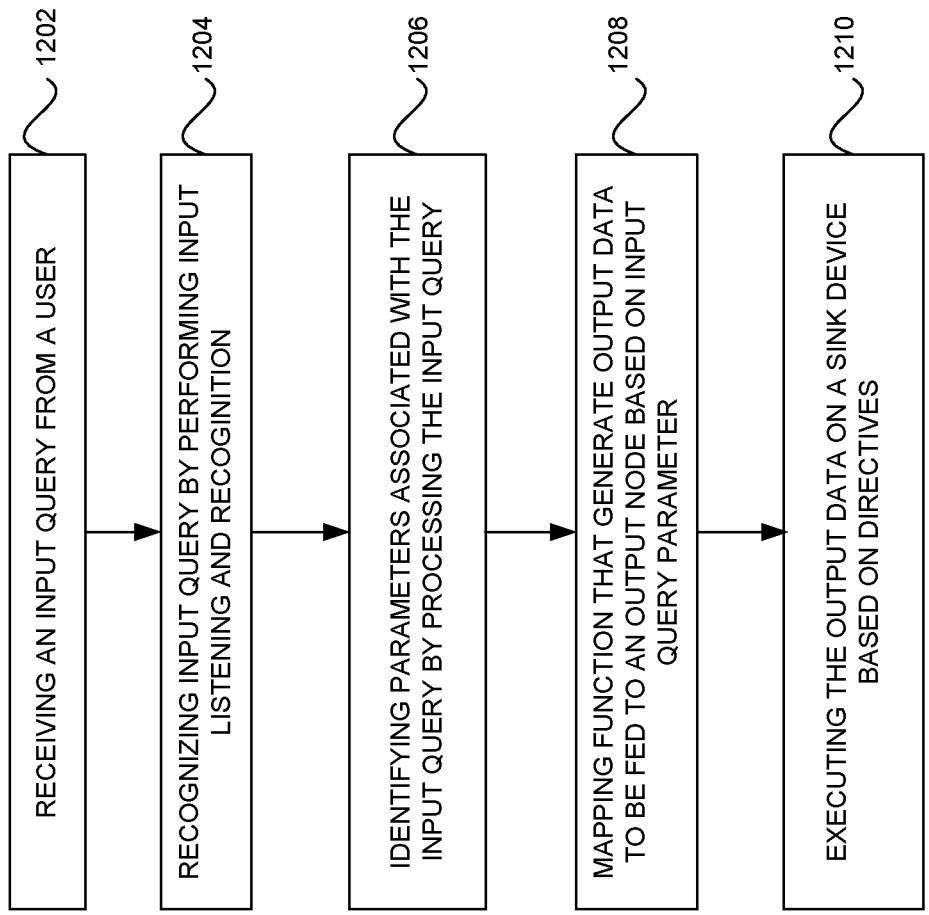
FIG. 12 illustrates a method of conversational event loop which encapsulates processing logic of general-purpose user-initiated conversation in accordance with the embodiments herein.

FIG. 12 illustrates a method of conversational event loop which encapsulates processing logic of general-purpose user-initiated conversation in accordance with the embodiments herein. At step 1202, an input query is received from a user. At step 1204, the input query is recognized by performing the input listening and recognition. At step 1206, the input query is processed to identify parameters associated with the input query. At step 1208, the parameters associated with the input query is mapped with functions that generates output data based on the input query parameter. At step 1210, the output data is executed on a sink device based on directives.

The embodiments herein provide a single conversational architecture to support any kind of conversation modalities using the artificially intelligent machine. The conversational architecture also supports combination of conversation modalities using the artificially intelligent machine.

Figure 13:
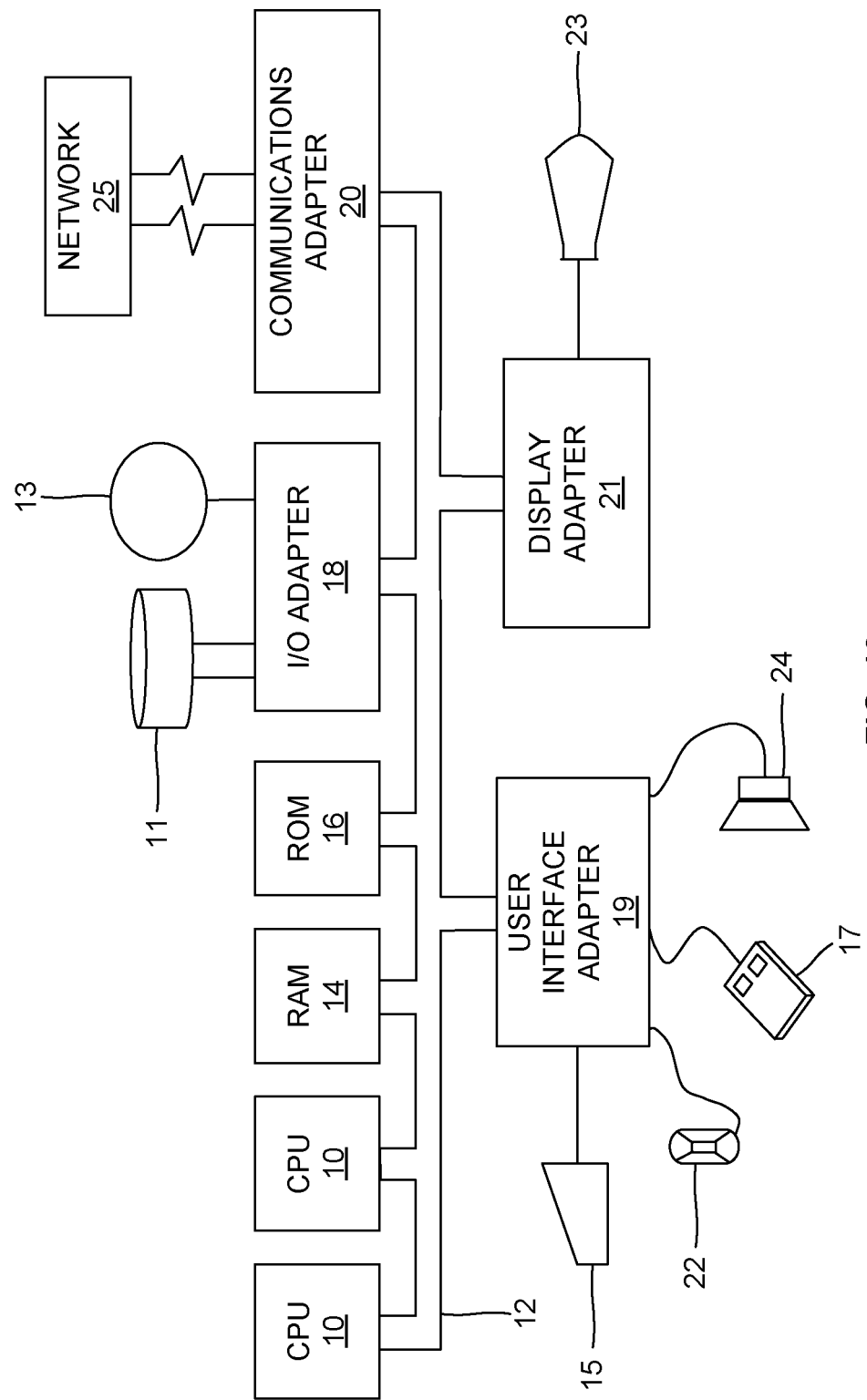
FIG. 13 is a schematic diagram of a computer architecture in accordance with the embodiments herein.

A representative hardware environment for practicing the embodiments herein is depicted in FIG. 13, with reference to FIGS. 1 through 13. This schematic drawing illustrates a hardware configuration of a server/computer system/computing device in accordance with the embodiments herein. The system includes at least one processing device CPU 10 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

We claim:

1. A system for user initiated conversation using an artificially intelligent machine, the system comprising:
   an artificially intelligent (AI) machine;
   a plurality of conversational nodes that are interconnected at edges to form a conversational network that encapsulates a conversational flow and logic to transport data associated with the conversational flow between the plurality of conversational nodes, wherein each of the plurality of conversational nodes are associated with salient information;
   a conversational server that is communicatively connected to the artificially intelligent machine, wherein the conversational server comprises a first memory that stores a first set of instructions and a processor that is configured to execute the first set of instructions to initiate the plurality of conversational nodes to perform steps of
      receiving an input query, at an input node, from a user to start the conversational flow using a first input modality and a second input modality, wherein the user provides the input query through (i) the first input modality comprising a microphone, a keypad, and a user interface, and (ii) the second input modality comprising a camera, and a sensor, wherein the input query comprises a speech, a text, an audio, a visual data, or a motion data;
      transforming the input query at an input recognizing node (IR) associated with the artificially intelligent machine, into a first format that is suitable for processing the input query, wherein the input recognizing node (IR) converts the speech into text for the input query received through the first input modality, and performs a facial recognition on the input query received through the second input modality, to transform the input query into the first format;
      determining, at a query processing node (F), at least one parameter associated with the input query by processing the first format of the input query using an artificially intelligent model, wherein the query processing node (F) transfers the conversational flow to a conversational node from the plurality of conversational nodes and the conversational node transfers the conversational flow to sub-query processing nodes to extract salient information associated with the input query to determine the at least one parameter, wherein the at least one parameter comprises an input category and subcategory, an input primary and secondary entity, an input sentiment, an intent, a predefined information associated with the input query, and an information associated with the user;
      executing a decision node (D) that maps the identified at least one parameter associated with the input query to a function node, wherein the decision node (D) selects at least one edge that is connected to an output node (O) based on the input query, the at least one parameter, and the salient information associated with the input query; and
      generating, by the function node, an output data to be fed to the output node (O) comprising a delay, an audio, a speech, a visual, and a motion execution block; and
      executing, using the output node (O) associated with the artificially intelligent machine, commands or directives in the output data according to a sequence of an output data structure.

2. The system of claim 1, wherein the system transfers the data associated with the conversational flow to the decision node to check if the input query is a newly generated query or a follow up input query and associates the primary entity or the input category to the follow up query.

3. The system of claim 1, wherein the system comprises a parallel node that executes a computational flow along all of the plurality of conversational nodes parallelly and waits for computation along all the conversational nodes before returning.

4. The system of claim 1, wherein the sub-query processing nodes comprise a first sub-query processing node and a second sub-query processing node, wherein the input category and the input subcategory of the input query is identified at the first sub-query processing node, or the primary entity and the secondary entity of the input query is detected at the second sub-query processing node.

5. The system of claim 1, wherein the plurality of conversational nodes comprise a sequential node, wherein the sequential node (S) is a structured activity node that executes a computational flow in a path along edges {1, 2, 3 . . . N} executing the computational flow in a sequence, wherein the sequential node provides Human Robot Interaction (HRI) where statements are spoken sequentially one after another by the user.

6. The system of claim 1, wherein the query processing node employs at least one parameter of an input part of speech (POS) tagging, a dependency parsing, a relationship extraction, or a constituent parsing.

7. The system as claimed in claim 1, wherein the output data is generated based on the input query that is recognized as at least one of a static information query or a dynamic information query.

8. The system as claimed in claim 1, wherein the output data is generated based on the input query that is recognized as a follow up query on the secondary entity, or a follow up query on the intent.

9. The system of claim 1, wherein the plurality of conversational nodes comprises a synchronous node, wherein the synchronous node transfers the conversational flow of execution to a downstream node and waits for execution to be completed before transferring the conversational flow to an upstream node.

10. The system of claim 1, wherein the plurality of conversational nodes comprises an asynchronous node, wherein the asynchronous node transfers the conversational flow of execution to a downstream node but does not wait for execution to be completed before transferring the conversational flow to an upstream node.

11. The system of claim 1, wherein the plurality of conversational nodes comprises a random node, wherein the random node selects one of the edges connected to the random node based on probability distribution of a conversational flow that is customised to the user.

12. The system of claim 1, wherein the commands are executed based on the output node that comprise of performing at least one action on the artificially intelligent machine or a remote device to capture data at the input.

13. The system of claim 1, wherein the conversational network comprises an access to the data associated with the conversational flow based on a partition key.

14. The system of claim 1, wherein the conversational network comprises a slot filling architecture.

15. A method for user initiated conversation using an artificially intelligent machine, the method comprising:
receiving an input query, at an input node, from a user to start a conversational flow using a first input modality and a second input modality, wherein a plurality of conversational nodes are interconnected at edges to form a conversational network that encapsulates a conversational flow and logic to transport data associated with the conversational flow between the plurality of conversational nodes, wherein the first input modality comprises a microphone, a keypad, and a user interface, and the second input modality comprises a camera, and a sensor, wherein the input query comprises a speech, a text, an audio, a visual data, or a motion data;
transforming the input query at an input recognizing node (IR) associated with the artificially intelligent machine, into a first format that is suitable to processing the input query, wherein the input recognizing node (IR) converts the speech into text for the input query received through the first input modality, and performs a facial recognition on the input query received through the second input modality, to transform the input query into the first format;
determining, at a query processing node (F), at least one parameter associated with the input query by processing the first format of the input query using an artificially intelligent model, wherein the query processing node (F) transfers the conversational flow to a conversational node from the plurality of conversational nodes and the conversational node transfers the conversational flow to sub-query processing nodes to extract salient information associated with the input query to determine the at least one parameter, wherein the at least one parameter comprises an input category and subcategory, an input primary and secondary entity, an input sentiment, an intent and an predefined information associated with the input query or an information associated with the user;
executing a decision node (D) that maps the identified at least one parameter associated with the input query to a function node, wherein the decision node (D) selects at least one edge that is connected to an output node (O) based on the input query, the at least one parameter, and the salient information associated with the input query;
generating, by the function node, an output data to be fed to the output node (O) comprising a delay, an audio, a speech, a visual, and a motion execution block; and
executing, using the output node (O) associated with the artificially intelligent machine, commands or directives in the output data according to a sequence of an output data structure.

16. One or more non-transitory computer readable storage medium storing one or more sequences of instructions, which when executed by one or more processors to perform a method for user initiated conversation using an artificially intelligent machine, by performing the steps of:
receiving an input query, at an input node, from a user to start a conversational flow using a first input modality and a second input modality, wherein a plurality of conversational nodes are interconnected at edges to form a conversational network that encapsulates a conversational flow and logic to transport data associated with the conversational flow between the plurality of conversational nodes, wherein the first input modality comprises a microphone, a keypad, and a user interface, and the second input modality comprises a camera, and a sensor, wherein the input query comprises a speech, a text, an audio, a visual data, or a motion data;
transforming the input query at an input recognizing node (IR) associated with the artificially intelligent machine, into a first format that is suitable to processing the input query, wherein the input recognizing node (IR) converts the speech into text for the input query received through the first input modality, and performs a facial recognition on the input query received through the second input modality, to transform the input query into the first format;
determining, at a query processing node (F), at least one parameter associated with the input query by processing the first format of the input query using an artificially intelligent model, wherein the query processing node (F) transfers the conversational flow to a conversational node from the plurality of conversational nodes and the conversational node transfers the conversational flow to sub-query processing nodes to extract salient information associated with the input query to determine the at least one parameter, wherein the at least one parameter comprises an input category and subcategory, an input primary and secondary entity, an input sentiment, an intent and an predefined information associated with the input query or an information associated with the user;
executing a decision node (D) that maps the identified at least one parameter associated with the input query to a function node, wherein the decision node (D) selects at least one edge that is connected to an output node (O) based on the input query, the at least one parameter, and the salient information associated with the input query;
generating, by the function node, an output data to be fed to the output node (O) comprising a delay, an audio, a speech, a visual, and a motion execution block; and
executing, using the output node (O) associated with the artificially intelligent machine, commands or directives in the output data according to a sequence of an output data structure.

* * * * *